Nov. 24, 1959 W. H. SILVER ET AL 2,914,342
HITCH DEVICE

Original Filed Aug. 28, 1953 2 Sheets-Sheet 1

INVENTORS.
WALTER H. SILVER
OREY W. OERMAN
BY *Roger C. Johnson*
ATTORNEY

Nov. 24, 1959   W. H. SILVER ET AL   2,914,342
HITCH DEVICE
Original Filed Aug. 28, 1953                   2 Sheets-Sheet 2
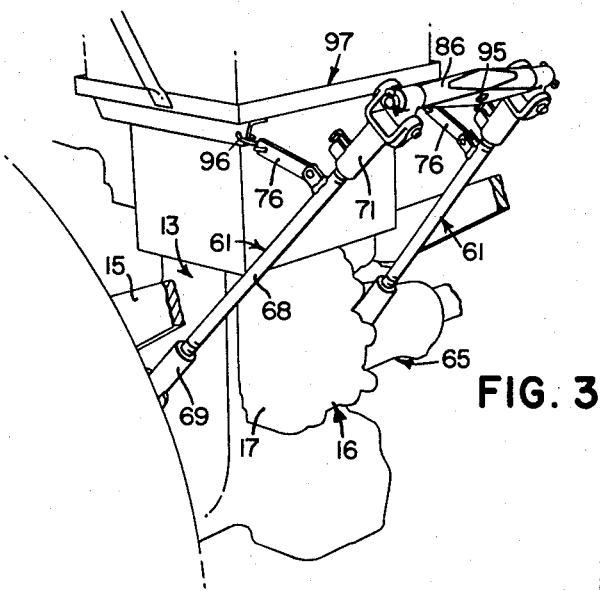
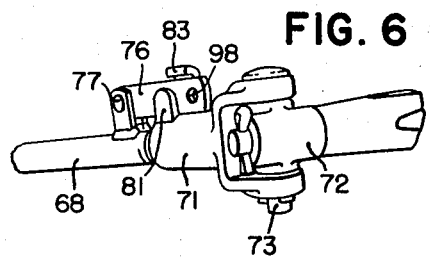
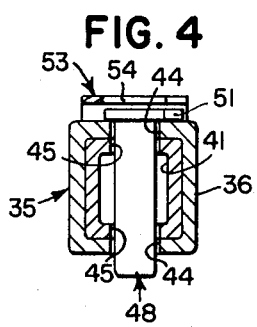
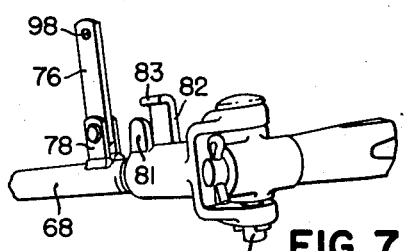
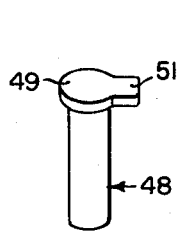
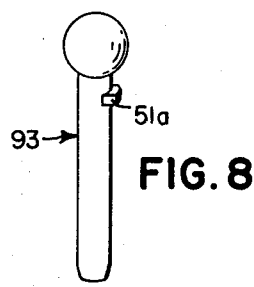
*INVENTORS.*
WALTER H. SILVER
OREY W. OERMAN
BY *Roger C. Johnson*
ATTORNEY

United States Patent Office 2,914,342
Patented Nov. 24, 1959

2,914,342

HITCH DEVICE

Walter H. Silver and Orey W. Oerman, Moline, Ill., assignors, by mesne assignments, to Deere & Company, a corporation of Delaware Original application August 28, 1953, Serial No. 377,134, now Patent No. 2,795,178, dated June 11, 1957. Divided and this application October 15, 1956, Serial No. 615,992

2 Claims. (Cl. 280—461)

This application is a division of our co-pending application, Ser. No. 377,134, filed August 28, 1953, for Hitch Device, now U.S. Patent 2,795,178, issued June 11, 1957.

The present invention relates generally to hitch devices and is more particularly concerned with hitch devices of the type wherein links, pivotally connected with the tractor power lift mechanism, are adapted to be directly connected to an associated implement for positioning and controlling the same in operation and for raising the same out of engagement with the ground when it is desired to transport the implement from place to place.

The object and general nature of the present invention is the provision of a hitch device that comprises two lower links and an upper link means, each being connected at its rear end with the implement for generally universal movement relative thereto and at its forward end with the propelling tractor also for generally universal movement; that is, movement which accommodates both lateral and vertical swinging of the implement relative to the tractor.

More specifically, it is an important feature of the present invention to provide means incorporated in one or both of the lower links to facilitate connecting the implement to the tractor. Such means preferably takes the form of a telescopic link construction with easily operated means for locking the elements of the telescopic link in proper relation.

Still further, a feature of this invention is the provision of upper link means, which may be in the form of a pair of links, having new and improved means for adjusting the effective length of said link means, which adjusting means includes a part serving, at one time, as a handle for effecting the desired adjustment and, at another time, as means for locking the adjustable parts against displacement from the position selected.

These and other objects and advantages of the present invention will be apparent to those skilled in the art after a consideration of the following detailed description, taken in conjunction with the accompanying drawings, in which:

Fig. 3 is a fragmentary perspective view showing the means for holding the upper links in inactive position when the implement is detached from the tractor.

Fig. 4 is an enlarged sectional view taken generally along the line 4—4 of Fig. 2.

Fig. 5 is a perspective view of the locking member shown in Figs. 2 and 4.

Fig. 6 is an enlarged fragmentary perspective view showing the adjustable upper link in locked position.

Fig. 7 is a view similar to Fig. 6, showing the locking mechanism unlatched and in a position to facilitate making the desired adjustment.

Fig. 8 is a perspective view of the rear or upper attaching pin.

Figure 1:
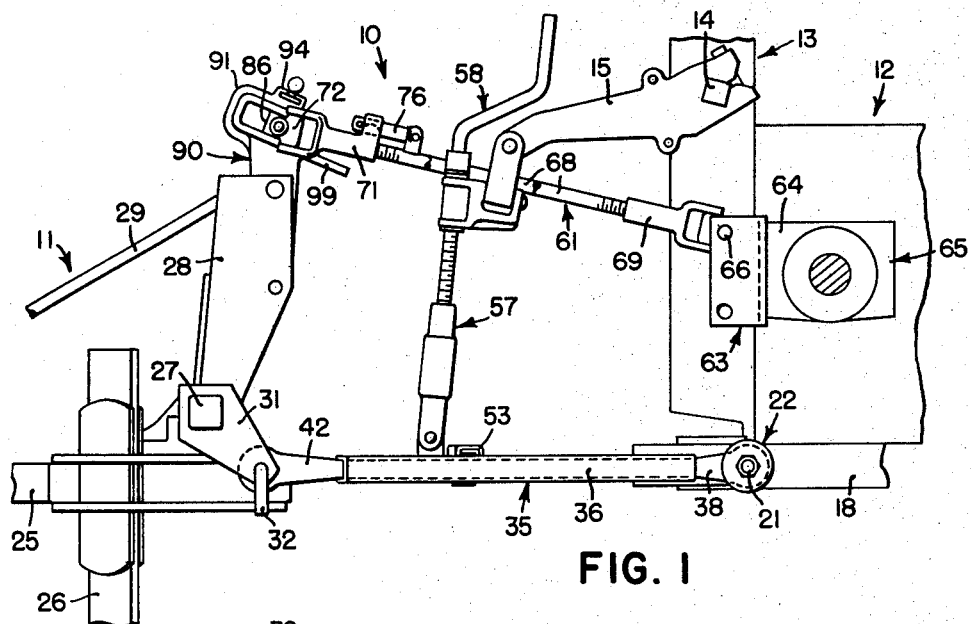
Fig. 1 is a side view of a hitch device in which the principles of the present invention have been incorporated.

The hitch device of the present invention is indicated in Fig. 1 in its entirety by the reference numeral 10 and is shown as connecting an implement 11 with a propelling tractor 12. The latter is of the type that is provided with a power lift mechanism 13, which mechanism includes a transverse rockshaft 14 to which a pair of lift arms 15 are connected. The power lift unit 13 usually includes control valve means and other mechanism indicated generally at 16, enclosed within a case 17 generally located at the rear of the tractor centrally thereof. The tractor 12 also includes a lower drawbar support structure 18 to each side of which a bracket 19 is connected by any suitable means. A stud 21 is fixed to each of the brackets 19 and receives the ball portion of a ball and socket type connector 22, there being one of such connectors at each side of the tractor. The implement 11 may be any one of a number of different kinds, but for purposes of illustration the implement is shown as a disk plow having a beam structure 25 to which disk-supporting standards 26 are fixed. The implement includes a rigid crossbar 27 and a vertically extending mast structure 28, the upper portion of which is reenforced by a downwardly and rearwardly extending brace 29, the rear end of which (not shown) is connected with the rear portion of the beam 25. Secured to each end of the implement front crossbar 27 is a pair of bracket plates 31, the forward and lower portions of which are apertured to receive a quick-detachable pin 32, on which pin the ball portion of a ball and socket type connector is mounted. Since this connector may be substantially identical with the ball and socket type connector mentioned above it is indicated in Figs. 1 and 2 by the same reference numeral.

Each of the two lower links is indicated in its entirety by the reference numeral 35. According to the principles of the present invention, each of the lower links 35 is made up of an outer sleeve section 36, square in cross section as indicated in Fig. 4. The forward end of the outer sleeve section 36 carries a forwardly extending attachment part 38 apertured to receive and retain the ball portion of the associated connector 22. Each link member 35 also includes an inner telescopically associated sleeve 41, square in cross section and slidably disposed within the section 36. At its rear end the sleeve section 41 receives a rear attachment part 42 which also is apertured to receive and retain the ball portion of the associated connector. A stop collar 43 is fixed, as by welding, to the rear attachment part 42 and serves as means limiting the rearward movement of the link section 36 relative to the inner section 41.

Figure 2:
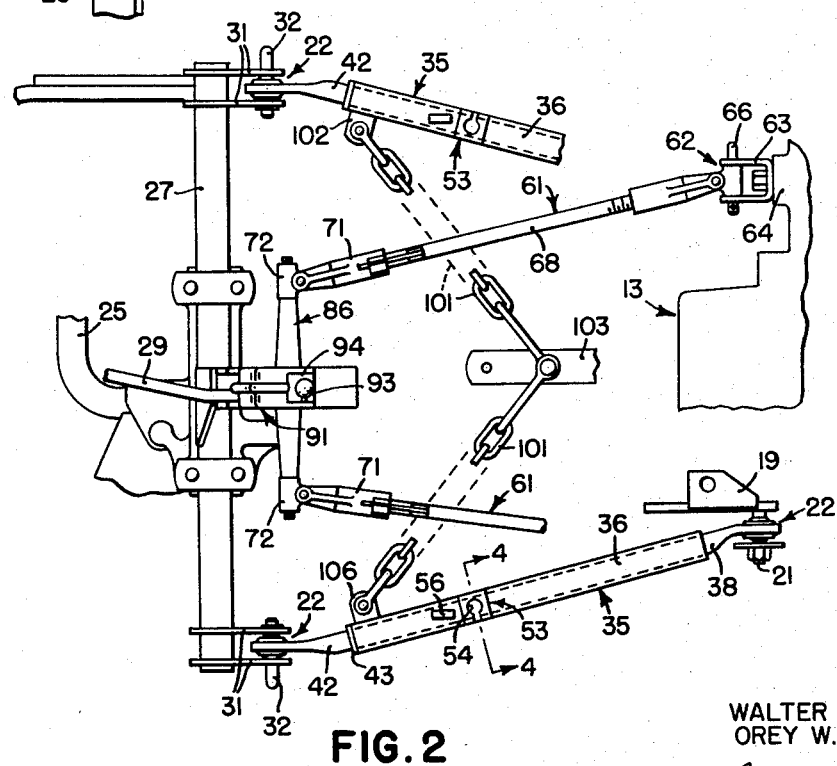
Fig. 2 is a plan view of the hitch device shown in Fig. 1.

As best shown in Figs. 2, 4 and 5, the inner and outer telescopically associated sections 36 and 41 are provided with apertures 44 and 45 (Fig. 4) which are adapted to be disposed in registry when the link sections 36 and 41 are disposed in their shortest or retracted positions. A lock pin 48 is disposable in the openings when in registry for preventing extension of the link sections. The lock pin 48 is provided with a head 49 having a locking extension 51, and for retaining the lock 48 in its locking position, the link section 36 carries a retaining yoke 53 having a keyhole slot 54 dimensioned to permit the passage of the locking pin head 49 into a locking position, as shown in Fig. 4. A slight turn of the pin 48, when in the position shown in Fig. 4, so disposes the extension 51 that it cooperates with the yoke 53 to retain the locking pin 48 in its link-holding position. Each of the outer telescopically associated sleeve sections 36 is provided with an apertured lug 56 pivotally receiving the lower end of the associated lifting link member 57, the upper portion of which is connected with the associated lifting arm 15 of the tractor power lift structure. The lifting link member 57 is of conventional construction, so far as the principles of the present invention are concerned, the upper portion of each of the links 57, or at least one of them, being provided with crank screw adjusting means 58 (Fig. 1).

As disclosed and claimed in the parent application, above identified, the upper link construction comprises a pair of link members 61, each pivotally connected at its forward end through a swivel connection 62, with a bracket 63 that is adapted to be fixed to the attaching pad 64 on the tractor rear axle structure 65. The swivel connection 62 includes a quick-attachable pin 66. Each link member 61 includes a rod 68 screw-threaded at each end and adjustably connected with an attaching yoke 69 that forms a part of the swivel connector 62. At its rear end each of the rod members 68 has a screw-threaded connection with a yoke member 71, the arms of which pivotally receive a swivel member 72, such pivotal connection being effected by a pivot pin 73, best shown in Figs. 6 and 7. By turning the rod member 68 in one direction or the other, the effective length of the link 61 is varied, as desired, by a turnbuckle action, and for retaining the desired adjustment the locking mechanism shown best in Figs. 6 and 7 and forming a part of the present invention is provided on each of the upper link members 61. Such locking member includes a detent member 76 pivoted, as at 77, to a pair of apertured lugs 78 welded to the rod section 68 adjacent the associated yoke 71. The latter member carries a pair of lugs 81 and 82 between which the outer end of the detent 76 is adapted to be disposed, and when so disposed, as shown in Fig. 6, the detent 76 prevents the rod section 68 from rotating in either direction relative to the associated yokes 69 and 71. The lug 82 is provided with an overhanging section 86 (Figs. 6 and 7), the purpose of which is to prevent accidental displacement of the locking detent 76, the overhanging portion 83 being so dimensioned that the passage of the detent 76 into locking position (Fig. 6) is accommodated. Preferably, the overhanging section 83 is arranged relative to the adjacent screw-threaded portion of the rod member 68 so that in normal operation, the tendency, if any, for the rod 68 to rotate out of position is in the direction that holds the detent 76 underneath the overhanging portion 83. In this way, accidental displacement of the locking member 76 is prevented.

The two swivel members 72, to which the coupler yokes 71 are swingably connected, are mounted at the ends of a transverse evener bar 86 that is connected at its midpoint with the upper portion of the mast section 28 of the associated implement 11. For the purpose of receiving the evener member 86, the upper portion of the implement mast section 28 carries an adaptor casting 90 having an upper bifurcated portion 91, which portion is apertured to receive a quick-attachable pin member 93. As best shown in Fig. 8, the pin 93 is substantially like the pin 48, having a locking extension 51a that cooperates with a yoke 94, which is substantially of the same construction as the yoke 53 described above, that is carried by the upper portion of the bifurcated section 91. As best shown in Fig. 3, the central portion of the evener bar 86 is apertured, as at 95, to receive the pin 93.

To hold the upper links 61 and associated parts in an inoperative position, as when the tractor is operated without an attached implement, a spring hook member 96 is connected to each side of the seat support 97 and is engageable in an aperture 98 formed in the associated locking detent 76 (Fig. 6).

The operation of the hitch device of the present invention is substantially as follows.

The implement 11 may be readily attached to the tractor 12 by backing the latter into approximately the necessary position to receive the implement. The upper forward portion of the attachment casting 98 is provided with an extension 99 that serves as a shelf to receive the evener bar 86 when the tractor approaches its implement-receiving position. With the tractor adjacent the implement, the pins 48 may be taken out of either or both of the lower links 35 and the rear or inner sections 41 thereof, or either of them, extended rearwardly to the point where the pins 32 may be passed through the rear connectors 22 to secure the rear ends of the links 35 to the implement. Then by backing the tractor the telescopically constructed links 35 are shifted into their retracted position, as determined by the stops 43, after which the pins 48 may readily be inserted and locked in position, thus conditioning the lower links 35 to transmit draft forces in tension. Next, the tractor power lift may be operated to raise or lower the link 35, and thus shift the upper end of the mast section 28 generally fore-and-aft so that the pin 93 may readily be dropped into position connecting the intermediate portion of the evener bar 86 to the upper end of the mast section 28. During this action the evener bar 86 shifts along the upper face of the extension 99, and also when the tractor approaches its implement-receiving position.

By having the upper link structure in the form of two forwardly divergently associated link members, the forward ends of the latter may readily be connected to the rear of the tractor at points laterally of the power lift structure 16, whereby the upper link structure does not interfere with the operaing parts of he tractor. At the same time, arranging the links 61 in a rearwardly divergent relation and connecting through an evener bar, such as 86, to the upper end of the implement mast structure, the geometry of the upper link structure is such that any tendency for the upper end of the mast section of the implement to shift laterally to an objectionable degree is materially restrained.

The provision of a hitch device that includes upper and lower links, with means attachable to the tractor drawbar support for receiving the forward ends of the lower links and means attachable to brackets at each side of the upper portion of the tractor, which brackets are especially adapted to be connected to the conventional or standard attaching pads on the tractor, produces a construction which is adaptable to a large number of tractors already in service with substantially no, or at least a minimum, requirement for modification. Additionally, lateral swinging of the lower links may be controlled or restrained by sway chains 101 that are connectible between lugs 102 on the link members 36 and the conventional tractor drawbar 103 that is carried by the drawbar support 18. In this case, the tractor drawbar 103 is connected by any suitable means (not shown) with the tractor drawbar support 18 so as to be prevented from lateral swinging relative to the tractor.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. A hitch device for connecting an implement having three connecting points to a tractor by backing the tractor into connecting position relative to the implement, said hitch comprising a pair of lower laterally spaced apart, generally fore-and-aft extending links adapted to be connected at their forward ends with the tractor at laterally spaced apart points thereon and at their rear ends with the implement at laterally spaced apart points thereon for both lateral and vertical swinging movement between said implement and said tractor, each of said lower links comprising a pair of parts relatively movable longitudinally, stop means on at least one of said parts and cooperating with the other part to define the fully retracted position of said parts and prevent further relative movement of said parts in the retracting direction, there being openings formed in said parts and disposed in registry when said parts are moved in their fully retracted position, and means insertable through each set of said openings when in registry to condition both of said lower links to transmit tensile forces, as when the tractor is driven forwardly, backing of the tractor until the stop means of both lower links comes into engagement with the associated link parts serving to shift a horizontally misaligned implement around until both sets of openings are in registry, thereby facilitating the insertion of said insertable means in the registering openings.

2. The invention set forth in claim 1, further characterized by said insertable means comprising a locking part for each lower link, and means carried on one part of each pair of parts to hold the associated locking part in locking position.

References Cited in the file of this patent

UNITED STATES PATENTS

| | | |
|---|---|---|
| 1,783,189 | Green | Dec. 2, 1930 |
| 1,903,695 | Chobert | Apr. 11, 1933 |
| 2,011,208 | Williams | Aug. 13, 1935 |
| 2,393,358 | Ferguson | Jan. 22, 1946 |
| 2,415,968 | Price | Feb. 18, 1947 |
| 2,617,660 | Hadlock | Nov. 11, 1952 |

FOREIGN PATENTS

| | | |
|---|---|---|
| 513,029 | Belgium | Aug. 14, 1952 |
| 1,035,218 | France | Apr. 15, 1953 |